United States Patent
Prasad et al.

(10) Patent No.: US 8,477,761 B2
(45) Date of Patent: Jul. 2, 2013

(54) UNIFIED SESSION SIGNALING SYSTEM FOR USE IN MULTIMEDIA COMMUNICATIONS

(75) Inventors: Vikas K. Prasad, Bangalore (IN); Srikanth Viswanath Nori, Bangalore (IN)

(73) Assignee: Ittiam Systems (P) Ltd., Bangalore, Karnataka (IN)

( * ) Notice: Subject to any disclaimer, the term of this patent is extended or adjusted under 35 U.S.C. 154(b) by 1076 days.

(21) Appl. No.: 12/056,272

(22) Filed: Mar. 27, 2008

(65) Prior Publication Data
US 2009/0245233 A1 Oct. 1, 2009

(51) Int. Cl.
*H04L 12/66* (2006.01)

(52) U.S. Cl.
USPC .......................................... 370/352

(58) Field of Classification Search
USPC .............. 455/67.1, 432.1, 466; 370/352, 261, 370/401, 356, 353, 468, 230, 389; 709/230, 709/218, 328; 348/14.01; 379/201.01; 726/14
See application file for complete search history.

(56) References Cited

U.S. PATENT DOCUMENTS

| | | | |
|---|---|---|---|
| 6,434,143 B1 * | 8/2002 | Donovan | 370/356 |
| 6,453,034 B1 * | 9/2002 | Donovan et al. | 379/220.01 |
| 6,654,606 B1 * | 11/2003 | Foti et al. | 455/432.1 |
| 6,865,681 B2 * | 3/2005 | Nuutinen | 726/14 |
| 7,002,912 B2 * | 2/2006 | Wengrovitz | 370/230 |
| 7,466,810 B1 * | 12/2008 | Quon et al. | 379/201.01 |
| 2002/0087741 A1 * | 7/2002 | Ing et al. | 709/328 |
| 2003/0040280 A1 * | 2/2003 | Koskelainen | 455/67.1 |
| 2004/0196867 A1 * | 10/2004 | Ejzak et al. | 370/468 |
| 2004/0255039 A1 * | 12/2004 | Honeisen | 709/230 |
| 2006/0034195 A1 * | 2/2006 | Blaiotta et al. | 370/261 |
| 2006/0146792 A1 * | 7/2006 | Ramachandran et al. | 370/352 |
| 2006/0262915 A1 * | 11/2006 | Marascio et al. | 379/201.01 |
| 2007/0121584 A1 * | 5/2007 | Qiu et al. | 370/352 |
| 2007/0189311 A1 * | 8/2007 | Kim et al. | 370/401 |
| 2007/0211705 A1 * | 9/2007 | Sunstrum | 370/356 |
| 2007/0213078 A1 * | 9/2007 | Shaheen | 455/466 |
| 2008/0013524 A1 * | 1/2008 | Hwang et al. | 370/352 |

(Continued)

FOREIGN PATENT DOCUMENTS
KR 2005087938 A * 9/2005

OTHER PUBLICATIONS
Internet papers: Alcatel pushes VoIP into branch office with new IP features for OmniPCX 4400; Feb. 6, 2001; 2 pp.*

*Primary Examiner* — Asad Nawaz
*Assistant Examiner* — Parth Patel
(74) *Attorney, Agent, or Firm* — Prakash Nama; Global IP Services, PLLC

(57) ABSTRACT

A design for a unified session signaling system for use in multimedia communications is disclosed. In one embodiment, a method includes interfacing, via an application interface, with an associated application and a session, tracking, via a call state/session manager, a call state and session properties across multiple calls associated with the session, managing, via a server interoperation module, registration and proxying services associated with the session, managing, via a basic SIP services module using a third party SIP stack, a basic set of SIP services associated with the application and the session, and determining and advertising, via a media negotiator module, media capabilities of devices associated with the session. The method may also include managing, via an additional SIP services module using the third party SIP stack, a set of additional services associated with the session.

15 Claims, 5 Drawing Sheets

U.S. PATENT DOCUMENTS

| | | |
|---|---|---|
| 2008/0232362 A1* | 9/2008 | Miyajima et al. ............. 370/389 |
| 2009/0034516 A1* | 2/2009 | Liu et al. ....................... 370/353 |
| 2010/0134587 A1* | 6/2010 | Grasso et al. .............. 348/14.01 |
| 2010/0217837 A1* | 8/2010 | Ansari et al. ................... 709/218 |

* cited by examiner

UNIFIED SESSION SIGNALING SYSTEM FOR USE IN MULTIMEDIA COMMUNICATIONS

TECHNICAL FIELD OF THE INVENTION

The present invention relates generally to multimedia communications, and more particularly relates to a design for a unified session signaling system for use in multimedia communications.

BACKGROUND OF THE INVENTION

Session Initiation Protocol (SIP) is a signaling protocol used for establishing sessions in an Internet Protocol (IP) network. There are various commercial and open-source implementations of SIP, which may differ significantly in their interfaces and SIP features/functionality they provide. Typically, systems using SIP also require some additional capabilities beyond basic signaling services. Systems such as IP Video Phone (IPVP), for example, may require call conferencing, multi-call support, media negotiation, and Network Address Translator (NAT) traversal. The above-mentioned requirements may involve significant system design variations and development efforts, depending on various factors such as end application and deployment scenarios.

BRIEF DESCRIPTION OF THE DRAWINGS

Example embodiments are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION OF THE INVENTION

A design for a unified session signaling system for use in multimedia communications is disclosed. In the following detailed description of the embodiments of the invention, reference is made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined only by the appended claims.

Figure 1:
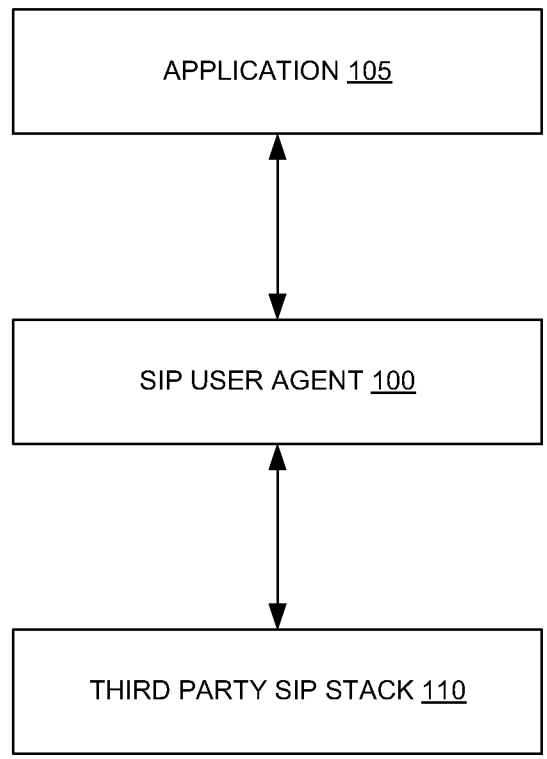
FIG. 1 is a block diagram illustrating a session initiation protocol (SIP) user agent associated with an application and a third party SIP stack to establish connection, and manage sessions and call states, according to an embodiment.

FIG. 1 is a block diagram illustrating a session initiation protocol (SIP) user agent 100 associated with an application 105 and a third party SIP stack 110 to establish connection, and manage sessions and call states, according to an embodiment. As shown in FIG. 1, the application 105 configures and uses the SIP user agent 100 through stack-independent interfaces that enable call control functionality associated with a session. The third party SIP stack 110 enables the SIP user agent 100 to manage SIP services associated with the application 105 and the session. As referred to herein, the "third party" SIP stack 110 includes SIP stacks from any external vendor, e.g., ones which may introduce differences in interfaces, features, and/or functionality of SIP. The SIP services, for example, include making a call, receiving a call, setting calls on hold, setting calls off hold, and registering with a server configured as a SIP registrar and/or a SIP proxy, sometimes referred to as a SIP registrar and/or a SIP proxy server, respectively. The third party SIP stack 110 also enables the SIP user agent 100 to manage additional services, such as transferring call, forwarding call, sending instant message, receiving instant message, sending presence information, and receiving presence information, associated with the application 105.

The SIP user agent 100 provides features such as call establishment and termination, SIP proxy server interoperation, media negotiation, call hold/call resume, call transfer, instant messaging and presence, network address translator (NAT) traversal, multi-call support, and/or SIP services for authentication and secure communication. In some embodiments, the SIP user agent 100 provides the call establishment and termination feature to establish calls between end points, to negotiate call parameters and to terminate the calls.

The SIP user agent 100 provides the SIP proxy server interoperation feature to allow users to register with the SIP proxy server such that all user agents connected to a particular server may communicate with each other through that server. Further, the SIP user agent 100 provides the call hold/call resume feature to set an active call on hold or resume a call that is on hold. The SIP user agent 100 also provides the call transfer feature to transfer calls to other endpoints. The SIP user agent 100 includes the instant messaging and presence feature to send instant message, receive instant message, send presence information, and/or receive presence information. The SIP user agent 100 provides the NAT traversal feature. In some embodiments, the SIP user agent 100 operates transparently behind any NAT/firewall. For example, the SIP user agent 100 takes steps necessary to keep open port mappings to ensure that users behind NAT devices can communicate over extended periods of time.

In addition, the SIP user agent 100 provides the multi-call support feature to allow an endpoint to initiate and participate in multiple independent calls simultaneously. The multi-call support feature allows the application 105 to easily implement conferencing sessions involving two or more users at a same time. Further, the SIP user agent 100 provides an authentication and secure communication feature. In these embodiments, the SIP user agent 100 may setup a session securely using hypertext transfer protocol (HTTP) authentication, and/or over a secure channel using methods such as transport layer security (TLS).

Figure 2:
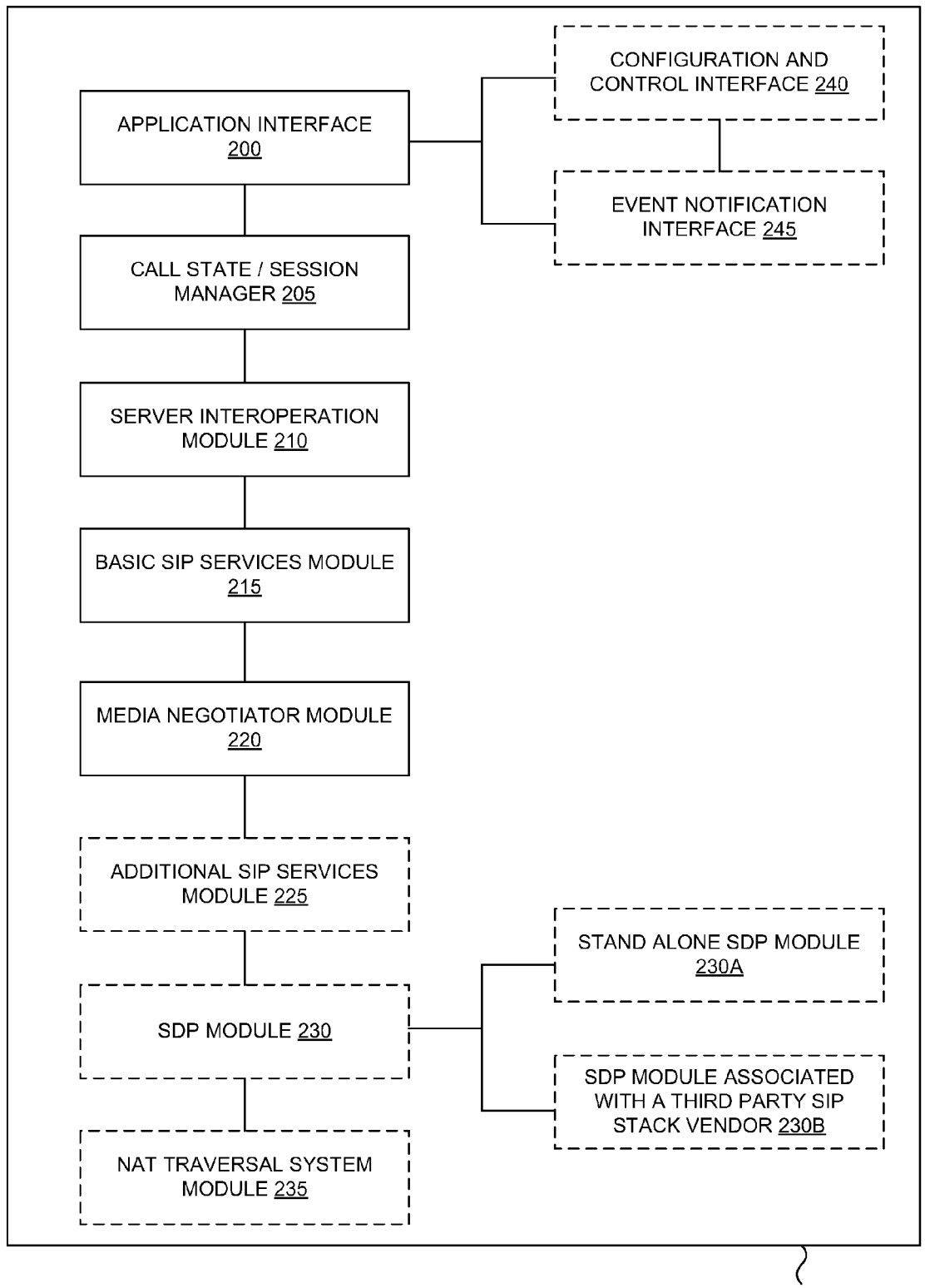
FIG. 2 is an exploded view of the SIP user agent of FIG. 1, according to one embodiment.

FIG. 2 is an exploded view of the SIP user agent 100 of FIG. 1, according to one embodiment. Particularly, FIG. 2 illustrates an application interface 200, a call state/session manager 205, a server interoperation module 210, a basic SIP services module 215, a media negotiator module 220, an additional SIP services module 225, a session description protocol (SDP) module 230, and an NAT traversal system module 235. Further as shown in FIG. 2, the application interface 200 includes a configuration and control interface 240 and an event notification interface 245 to interface with the associated application 105 and the session. In these embodiments, the configuration and control interface 240 enables call control functionality via at least one SIP stack-independent interface, and the event notification interface 245 indicates SIP events to the application 105 in a way independent of the underlying SIP stack.

The call state/session manager 205 tracks a call state and session properties across multiple calls associated with the session. The server interoperation module 210 manages registration and proxying services associated with the session. The basic SIP services module 215 manages a basic set of SIP services associated with the application and the session using a third party SIP stack 110. In some embodiments, the basic set of SIP services includes making a call, receiving a call, setting calls on hold, setting calls off hold, and/or registering with a SIP registrar and/or a SIP proxy server.

The media negotiator module 220 determines and advertises media capabilities of devices associated with the session. Further, the media negotiator module 220 enables sending and receiving Session Description Parameters via an SDP module 230 such as a stand alone SDP module 230A (implemented within the SIP user agent 100) and/or an SDP module provided as part of the third party SIP stack 110 (e.g., the SDP module associated with a third party SIP stack vendor 230B). The additional SIP services module 225 manages a set of additional services using the third party SIP stack 110. In some embodiments, the set of additional services includes transferring call, forwarding call, sending instant message, receiving instant messages, sending presence information, and/or receiving presence information.

The NAT traversal system module 235 implements at least one method of an NAT device traversal transparent to a user and the application 105. In some embodiments, the method of an NAT device traversal includes sending keep alive packets, UPnP, TURN, ICE and/or STUN.

Figure 3:
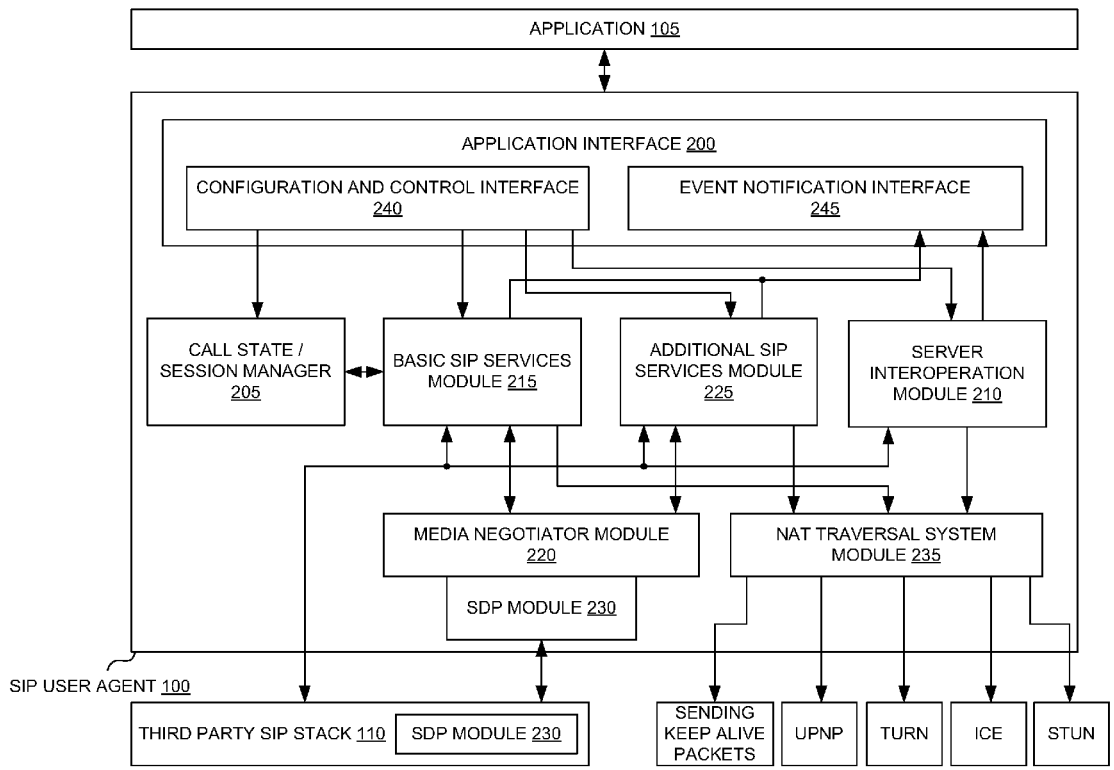
FIG. 3 is a block diagram illustrating a high level architecture of the SIP user agent associated with the application and a session, according to one embodiment.

FIG. 3 is a block diagram 300 illustrating a high level architecture of the SIP user agent 100 associated with the application 105 and the session, according to one embodiment. As shown in FIG. 3, the SIP user agent 100 interfaces with the application 105. Further as shown in FIG. 3, the SIP user agent 100 includes the application interface 200, the call state/session manager 205, the server interoperation module 210, the basic SIP services module 215, the media negotiator module 220, the additional SIP services module 225, the SDP module 230, and the NAT traversal system module 235.

Further as shown in FIG. 3, the application interface 200 includes the configuration and control interface 240 which translates user commands and communicates the user commands with other parts of the system such as the call state/session manager 205, the server interoperation module 210, the basic SIP services module 215, and the additional SIP services module 225. The application interface 200 also includes event notification interface 245 that interfaces with the server interoperation module 210, the basic SIP services module 215, and the additional SIP services module 225. In some embodiments, the call state/session manager 205 is coupled to the basic SIP services module 215 to track a call state and session properties across multiple calls associated with the session.

Further as shown in FIG. 3, the media negotiator module 220 is coupled to the basic SIP services module 215 and the additional SIP services module 225. The media negotiator module 220 is coupled to the SDP module 230. The SDP module 230 may be present within the SIP stack itself, or alternatively, the SDP module 230 present in third party SIP stack 110 may directly be used. The NAT traversal system module 235 interfaces with the server interoperation module 210, the basic SIP services module 215, and the additional SIP services module 225. The third party SIP stack 110 communicates with the server interoperation module 210, the basic SIP services module 215, and the additional SIP services module 225.

As illustrated above, the call state/session manager 205 tracks a call state and session properties across multiple calls associated with the session. In some embodiments, the session includes the multiple calls, whereby each call goes through various stages such as set up, active, teardown, etc. Further, each call may have distinct set of capabilities.

The server interoperation module 210 manages registration and proxying services associated with the session. In these embodiments, in case of the SIP user agent 100 chooses to register with a SIP server, then signaling information is routed through the SIP proxy server to other participants of the session.

The basic SIP services module 215 manages a basic set of SIP services associated with the application 105 and the session using the third party SIP stack 110. The media negotiator module 220 determines and advertises media capabilities of devices associated with the session. In some embodiments, the media negotiator module 220 is configured with local devices' codec set and priority. For example, when a new session is established, the media negotiator module 220 takes into account local priority and remote devices' priority and decides the media capabilities of the devices by negotiating with the remote end. The local device's codec priority/choice used during negotiation may be set at run time by the application 105 depending on the clock cycles and memory availability for a particular codec at the time of negotiation.

The additional SIP services module 225 manages a set of additional services such as transferring call, forwarding call, sending instant message, receiving instant messages, sending presence information, and receiving presence information, using the third party SIP stack 110. The media negotiator module 220 further enables sending and receiving Session Description Parameters via an SDP module (e.g., the stand alone SDP module 230A and/or the SDP module associated with a third party SIP stack vendor 230B).

The IPv4 address space is divided into two basic types, i.e., publicly routable addresses and private addresses. A publicly routable address is accessible from anywhere on the internet, whereas a private address is only accessible within a private network, such as a LAN environment (e.g., an office or home network). One private network with many networked devices inside it is typically connected to the public internet via a single external, publicly routable IP address. A Network Address Translator (NAT) is a device designed to share this one external, publicly-routable IP address among the multiple clients on the private network. The NAT device then acts as a gateway between the private and the public networks, and assigns an external port for each connection between the external network and the internal network.

Further, the NAT traversal system module 235 implements a method of NAT device traversal, transparent to a user and the application 105. For example, users of SIP devices are typically situated in homes or offices with their own LAN and a private IP address. They connect to public networks through NAT devices. The NAT devices, designed to share the IPv4 address space, may cause problems with SIP due to their nature, i.e., since SIP messages contain IP and port information inside the body of network packets. When a SIP device inside a NAT generates a SIP message, it places the private IP address and port in the message and sends it through the NAT. When the remote device receives this it sees the private IP address, which is not usable. The SIP message should be modified to include the public IP instead of the private IP or enable the SIP proxy server to route the incoming packets appropriately as the server may have mechanisms such as maintaining a mapping table of users and routable IP addresses. Therefore, the SIP user agent 100 implements NAT device traversal methods such as sending keep-alive packets, UPnP, TURN, ICE, and/or STUN to provide additional features that are needed to overcome the above mentioned problem.

The configuration and control interface 240 enables call control functionality via at least one SIP stack-independent interface. In these embodiments, the application 105 may configure and use the SIP user agent 100 through a set of well defined stack-independent interfaces that enable required call functionalities. The event notification interface 245 indicates SIP events to the application 105. In these embodiments, the SIP user agent 100 includes the event notification interface 245 to indicate the SIP events to the application 105 through a system of callbacks. In one example embodiment, whenever a SIP event (e.g., incoming call alert, outgoing call succeeded, etc.) that the application 105 needs to be aware of occurs, only then these call backs are called.

Figure 4:
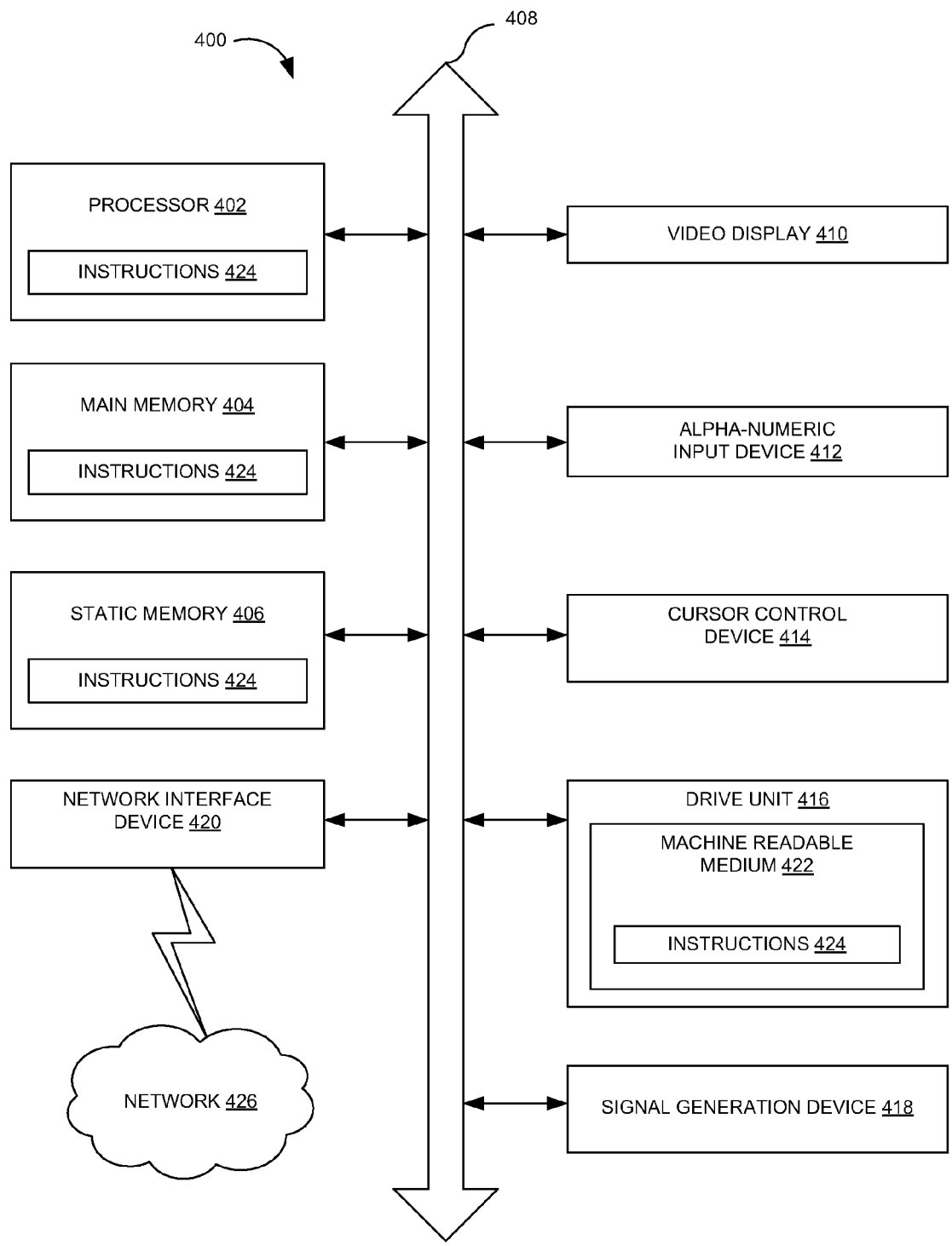
FIG. 4 illustrates a diagrammatic system view of a data processing system in which any of the embodiments disclosed herein may be performed, according to one embodiment.

FIG. 4 illustrates a diagrammatic system view 400 of a data processing system in which any of the embodiments disclosed herein may be performed, according to one embodiment. Particularly, the diagrammatic system view of FIG. 4 illustrates a processor 402, a main memory 404, a static memory 406, a bus 408, a video display 410, an alpha-numeric input device 412, a cursor control device 414, a drive unit 416, a signal generation device 418, a network interface device 420, a machine readable medium 422, instructions 424, and a network 426.

The diagrammatic system view 400 may indicate a personal computer and/or a data processing system in which one or more operations disclosed herein are performed. The processor 402 may be a microprocessor, a state machine, an application specific integrated circuit, a field programmable gate array, etc. The main memory 404 may be a dynamic random access memory and/or a primary memory of a computer system. The static memory 406 may be a hard drive, a flash drive, and/or other memory information associated with the data processing system.

The bus 408 may be an interconnection between various circuits and/or structures of the data processing system. The video display 410 may provide graphical representation of information on the data processing system. The alpha-numeric input device 412 may be a keypad, keyboard and/or any other input device of text (e.g., a special device to aid the physically handicapped). The cursor control device 414 may be a pointing device such as a mouse. The drive unit 416 may be a hard drive, a storage system, and/or other longer term storage subsystem.

The signal generation device 418 may be a bios and/or a functional operating system of the data processing system. The network interface device 420 may perform interface functions (e.g., code conversion, protocol conversion, and/or buffering) required for communications to and from the network 426 between a number of independent devices (e.g., of varying protocols). The machine readable medium 422 may provide instructions on which any of the methods disclosed herein may be performed. The instructions 424 may provide source code and/or data code to the processor 402 to enable any one or more operations disclosed herein.

For example, a storage medium having instructions, that when executed by a computing platform, result in execution of a method of the SIP user agent 100 associated with the application 105 and the session, includes interfacing, via the application interface 200, with the associated application 105 and the session, tracking, via the call state/session manager 205, a call state and session properties across multiple calls associated with the session, managing, via the server interoperation module 210, registration and proxying services associated with the session, managing, via the basic SIP services module 215 using the third party SIP stack 110, a basic set of SIP services associated with the application 105 and the session, and determining and advertising, via the media negotiator module 220, media capabilities of devices associated with the session. In some embodiments, the application interface 200 enables, via the configuration and control interface 240, call-control functionality via at least one SIP stack-independent interface, and indicates, via the event notification interface 245, SIP events to the application 105.

The storage medium may have instructions to manage, via the additional SIP services module 225 using the third party SIP stack 110, a set of additional services associated with the session. The storage medium may also have instructions to enable, via the media negotiator module 220, sending and receiving Session Description Parameters via the stand alone SDP module 230A and/or the SDP module associated with a third party SIP stack vendor 230B. Further, the storage medium may have instructions to implement, via the NAT traversal system module 235, a method of an NAT device traversal transparent to a user and the application 105.

Figure 5:
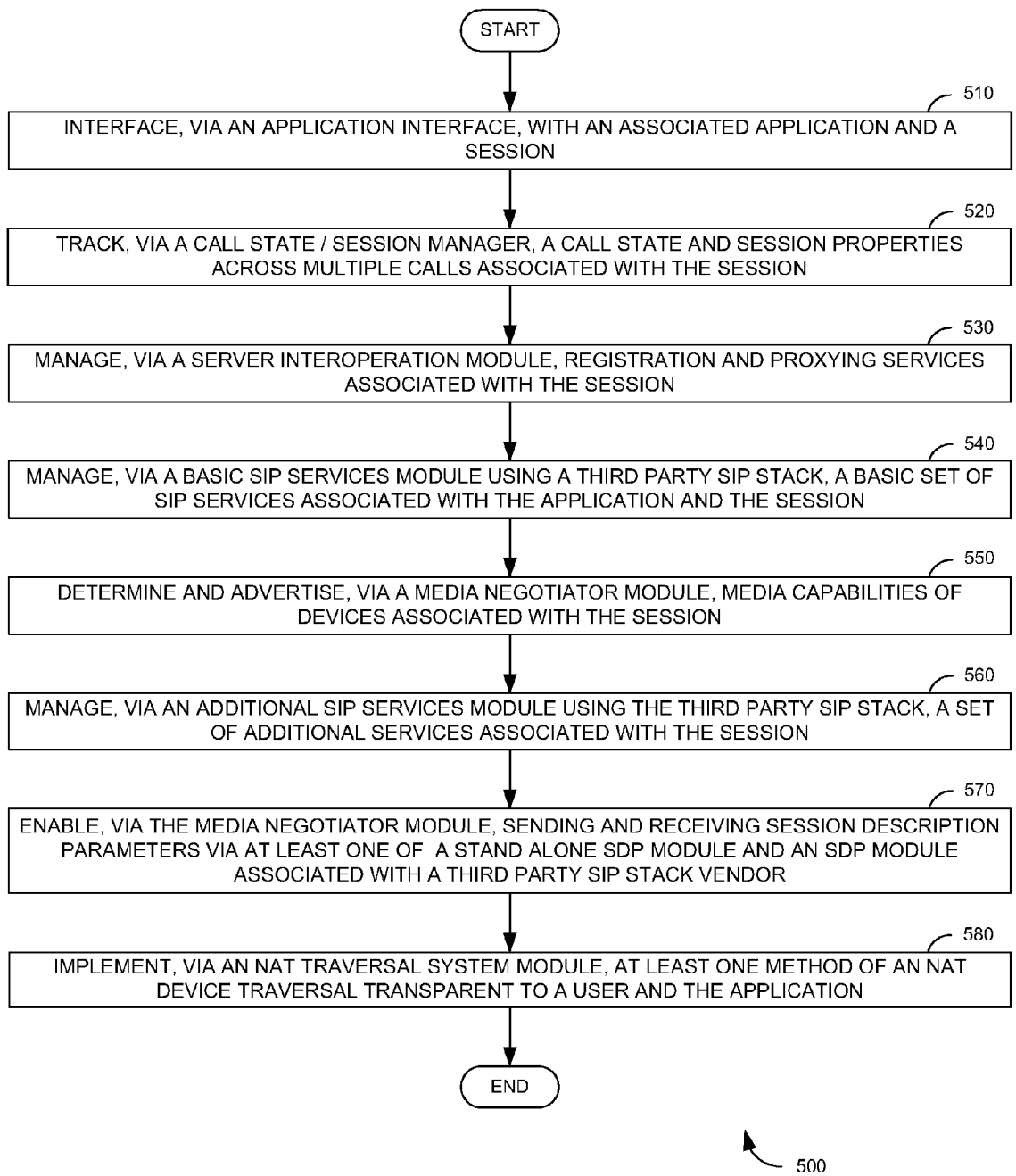
FIG. 5 is a process flow illustrating a method of a SIP user agent associated with an application and a session, according to one embodiment.

FIG. 5 is a process flow 500 illustrating a method of a SIP user agent 100 associated with an application 105 and a session, according to one embodiment. In operation 510, interfacing with the associated application 105 and the session is enabled via an application interface 200. In some embodiments, the application interface 200 enables, via the configuration and control interface 240, call control functionality via a SIP stack-independent interface and indicates SIP events to the application 105 via the event notification interface 245.

In operation 520, a call state and session properties are tracked across multiple calls associated with the session via the call state/session manager 205. In operation 530, registration and proxying services associated with the session are managed via the server interoperation module 210. In operation 540, a basic set of SIP services associated with the application 105 and the session are managed using a third party SIP stack 110, via the basic SIP services module 215. In some embodiments, the basic set of services includes making a call, receiving a call, setting calls on hold, setting calls off hold, registering with a SIP registrar and/or a SIP proxy server, and the like.

In operation 550, media capabilities of devices associated with the session are determined and advertised via the media negotiator module 220. In operation 560, a set of additional services associated with the session are managed (using the third party SIP stack 110), via the additional SIP services module 225. In some embodiments, the set of additional services includes transferring call, forwarding call, sending instant message, receiving instant message, sending presence information, receiving presence information and the like.

In operation 570, sending and receiving Session Description Parameters via the stand alone SDP module 230A and/or the SDP module associated with a third party SIP stack vendor 230B are enabled via the media negotiator module 220.

The SDP module 230 may be present within the SIP user agent 100 itself, or it may make use of the SDP module provided by the third party SIP stack vendor. In operation 580, at least one method of an NAT device traversal transparent to a user and the application is implemented via the NAT traversal system module 235. For example, the method of an NAT device traversal includes sending keep alive packets, UPnP, TURN, ICE, STUN and/or the like.

The above-described SIP user agent 100 operates over any SIP stack, thus allowing a user to license a SIP stack of his/her choice. The SIP user agent 100 can be built for that licensed SIP stack with all the features provided as described above. The application 105 configures the SIP user agent 100 once and the SIP user agent 100 decides media to be negotiated, since the media negotiation need not be handled by the application 105. Further, the SIP user agent 100 communicates the negotiated media to the application 105.

The above-described SIP user agent 100 manages NAT traversal internally, and keeps the process hidden from the user. The NAT traversal is a mandatory requirement for majority of deployments. This feature is usually implemented in the SIP user agent 100 and may not be present in the conventional SIP stack. Further, the SIP user agent 100 makes the signaling process convenient and simple for multi-way conferencing. For example, the multi-way conferencing is useful for connecting diverse teams, separated by large distances.

The SIP user agent 100 communicates with the application 105 by raising events when a particular SIP activity is started or completed. This feature allows the application 105 to handle SIP events only when needed, and leaves the application 105 free to perform its own processing when not needed.

The above-described SIP user agent 100 also includes capabilities to register with a SIP server and route all session communications through that server. For example, commercial deployments of videophones and other IP communications require a central server that behaves as a SIP registrar and/or a SIP proxy.

Further, the above-described SIP user agent 100 is not application dependent and it can be used for any purpose. While many conventional SIP solutions are often geared towards a particular application, the design of the SIP user agent 100 can be extended to any application that requires signaling. Further, the SIP user agent 100 consists of well defined APIs (Application Programming Interface) that are maintained constant for any underlying implementation. The SIP user agent architecture 100 hides the core application from implementation/deployment/usage variations across multiple applications, enabling significant reuse, maintainability and extensibility, thereby reducing system integration effort and time to market. Further, the SIP user agent 100 maintains event-driven nature of SIP and frees applications to perform other tasks in the period between SIP events, thus increasing efficiency of the system.

Although the present embodiments have been described with reference to specific example embodiments, it will be evident that various modifications and changes may be made to these embodiments without departing from the broader spirit and scope of the various embodiments. For example, the various devices, modules, analyzers, generators, etc. described herein may be enabled and operated using hardware circuitry (e.g., CMOS based logic circuitry), firmware, software and/or any combination of hardware, firmware, and/or software (e.g., embodied in a machine readable medium). For example, the various electrical structure and methods may be embodied using transistors, logic gates, and electrical circuits (e.g., application specific integrated ASIC circuitry).

In addition, it will be appreciated that the various operations, processes, and methods disclosed herein may be embodied in a machine-readable medium and/or a machine accessible medium compatible with a data processing system (e.g., a computer system), and may be performed in any order. Accordingly, the specification and drawings are to be regarded in an illustrative rather than a restrictive sense.

What is claimed is:

1. A method, comprising:
 interfacing, via an application interface residing in a session initiation protocol (SIP) user agent, with an associated application and a session, wherein the step of interfacing comprises:
  interfacing the application with a third party SIP stack to enable call control functionality and network address translator (NAT) traversal functionality associated with the session via a configuration and control interface that resides in the SIP user agent, wherein the third party SIP stack is external to the SIP user agent and comprises multiple SIP stacks implemented by a plurality of external SIP stack vendors; and
  indicating SIP events that the application needs to be aware of to the application through a system of callbacks via an event notification interface that resides in the SIP user agent, wherein the SIP events are associated with the call control functionality and the NAT traversal functionality;
 managing, via the server interoperation module residing in the SIP user agent, registration and proxying services associated with the session using the third party SIP stack upon enabling the call control functionality and the NAT traversal functionality;
 tracking, via a call state/session manager residing in the SIP user agent, a call state and session properties across multiple calls associated with the session while managing the registration and proxying services associated with the session;
 managing, via a basic SIP services module coupled to the call state/session manager and residing in the SIP user agent, a basic set of SIP services associated with the application and the session using the third party SIP stack and the tracked call state and session properties, wherein the configuration and control interface translates and sends user commands to the call state/session manager, the server interoperation module, and the basic SIP services module;
 determining and advertising, via a media negotiator module coupled to the basic SIP services module and residing in the SIP user agent, media capabilities of devices associated with the session; and
 implementing, via an NAT traversal system module coupled to the basic SIP services module and the server interoperation module and residing in the SIP user agent, a method of an NAT device traversal transparent to a user and the application.

2. The method of claim 1, further comprising:
 managing, via an additional SIP services module using the third party SIP stack, a set of additional services associated with the session.

3. The method of claim 2, wherein the set of additional services comprises at least one of transferring call, forwarding call, sending instant message, receiving instant message, sending presence information, and receiving presence information.

4. The method of claim 1, further comprising:
 enabling, via the media negotiator module, sending and receiving session description parameters via at least one of a stand alone session description protocol (SDP) module and an SDP module associated with a third party SIP stack vendor.

5. The method of claim 1, wherein the method of an NAT device traversal further comprises at least one of sending keep alive packets, Universal Plug and Play (UPnP), Traversal Using Relays around NAT (TURN), Interactive Connectivity Establishment (ICE) and Session Traversal Utilities for NAT (STUNT to the SIP proxy server.

6. The method of claim 1, wherein the basic set of SIP services comprises at least one of making a call, receiving a call, setting calls on hold, setting calls off hold, and registering with at least one of a SIP registrar and the SIP proxy server.

7. The method of claim 1, wherein the third party SIP stack provides a common interface that is independent of the third party SIP stack.

8. A system, comprising:
an application;
a third party session initiation protocol (SIP) stack comprising multiple SIP stacks implemented by a plurality of external SIP stack vendors;
a SIP user agent associated with the application and the third party SIP stack, wherein the SIP user agent comprises:
an application interface to interface with the application and a session, wherein the application interface comprises:
a configuration and control interface to interface the application with the third party SIP stack to enable call control functionality and network address translator (NAT) traversal functionality associated with the session; and
an event notification interface to indicate SIP events that the application needs to be aware of to the application through a system of callbacks, wherein the SIP events are associated with the call control functionality and the NAT traversal functionality;
a server interoperation module to manage registration and proxying services associated with the session using the third party SIP stack upon enabling the call control functionality and the NAT traversal functionality;
a call state/session manager to track a call state and session properties across multiple calls associated with the session while managing the registration and proxying services associated with the session;
a basic SIP services module coupled to the call state/session manager to manage, using the third party SIP stack, a basic set of SIP services associated with the application and the session using the tracked call state and session properties, wherein the configuration and control interface translates and sends user commands to the call state/session manager, the server interoperation module, and the basic SIP services module;
a media negotiator module coupled to the basic SIP services module to determine and advertise media capabilities of devices associated with the session; and
an NAT traversal system module coupled to the basic SIP services module and the server interoperation module to implement a method of an NAT device traversal transparent to a user and the application.

9. The system of claim 8, further comprising:
an additional SIP services module to manage, using the third party SIP stack, a set of additional services.

10. The system of claim 9, wherein the set of additional services comprises at least one of transferring call, forwarding call, sending instant message, receiving instant messages, sending presence information, and receiving presence information.

11. The system of claim 8, wherein the media negotiator module further enables sending and receiving Session Description Parameters via at least one of a stand alone session description protocol (SDP) module and an SDP module associated with a third party SIP stack vendor.

12. The system of claim 8, wherein the method of an NAT device traversal further comprises at least one of sending keep alive packets, Universal Plug and Play (UPnP), Traversal Using Relays around NAT (TURN), Interactive Connectivity Establishment (ICE) and Session Traversal Utilities for NAT (STUN) to the SIP proxy server.

13. The system of claim 8, wherein the basic set of SIP services comprises at least one of making a call, receiving a call, setting calls on hold, setting calls off hold, and registering with at least one of a SIP registrar and the SIP proxy server.

14. An article, comprising:
a non-transitory computer-readable storage medium having instructions that, when executed by a computing platform, result in execution of a method of providing a SIP user agent associated with an application and a session, comprising:
interfacing, via an application interface residing in a session initiation protocol (SIP) user agent, with the associated application and the session, wherein the step of interfacing comprises:
interfacing the application with a third party SIP stack to enable call control functionality and network address translator (NAT) traversal functionality associated with the session via a configuration and control interface that resides in the SIP user agent, wherein the third party SIP stack is external to the SIP user agent and comprises multiple SIP stacks implemented by a plurality of external SIP stack vendors; and
indicating SIP events that the application needs to be aware of to the application through a system of callbacks via an event notification interface that resides in the SIP user agent, wherein the SIP events are associated with the call control functionality and the NAT traversal functionality;
managing, via a server interoperation module residing in the SIP user agent, registration and proxying services associated with the session using the third party SIP stack upon enabling the call control functionality and the NAT traversal functionality;
tracking, via a call state/session manager residing in the SIP user agent, a call state and session properties across multiple calls associated with the session while maintaining the registration and proxying services associated with the session;
managing, via a basic SIP services module coupled to the call state/session manager and residing in the SIP user agent, a basic set of SIP services associated with the application and the session using the third party SIP stack and the tracked call state and session properties, wherein the configuration and control interface translates and sends user commands to the call state/session manager, the server interoperation module, and the basic SIP services module;
determining and advertising, via a media negotiator module coupled to the basic SIP services module and residing in the SIP user agent, media capabilities of devices associated with the session; and implementing, via an NAT traversal system module coupled to the basic SIP services module and the server interoperation module and residing in the SIP user agent, a method of an NAT device traversal transparent to a user and the application.

15. The article of claim 14, further comprising:

managing, via an additional SIP services module using the third party SIP stack, a set of additional services associated with the session; and enabling, via the media negotiator module, sending and receiving Session Description Parameters via at least one of a stand alone session description protocol (SDP) module and an SDP module associated with a third party SIP stack vendor.

* * * * *